United States Patent
Stephenson, III (10) Patent No.: US 7,286,111 B2
(45) Date of Patent: *Oct. 23, 2007

(54) APPARATUS FOR ELECTRO-OPTICALLY WRITING A DISPLAY

(75) Inventor: Stanley W. Stephenson, III, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 405 days.

This patent is subject to a terminal disclaimer.

(21) Appl. No.: 10/712,329

(22) Filed: Nov. 13, 2003

(65) Prior Publication Data

US 2005/0104806 A1 May 19, 2005

(51) Int. Cl.
G09G 3/36 (2006.01)
(52) U.S. Cl. ............... 345/104; 345/179; 178/18.09; 349/22; 349/175; 427/163.4
(58) Field of Classification Search .......... 345/87–104, 345/204–205, 173–183; 178/18.09, 19.05; 349/2, 22, 175, 186, 20, 35, 115; 427/163.4
See application file for complete search history.

(56) References Cited

U.S. PATENT DOCUMENTS

| | | |
|---|---|---|
| 3,401,262 A | 9/1968 | Fergason et al. |
| 3,578,844 A | 5/1971 | Kettering et al. |
| 3,789,225 A | 1/1974 | Leder |
| 3,798,225 A | 3/1974 | Kreighbaum et al. |
| 4,240,712 A | 12/1980 | Thirant |
| 4,288,822 A * | 9/1981 | Hareng et al. ............... 358/296 |
| 4,367,407 A | 1/1983 | Gottert et al. |
| 4,595,260 A | 6/1986 | Kubota |
| 5,072,239 A | 12/1991 | Mitcham et al. |
| 5,272,552 A * | 12/1993 | Yoshinaga et al. .......... 349/183 |

(Continued)

FOREIGN PATENT DOCUMENTS

| | | |
|---|---|---|
| EP | 0 795 771 A2 | 9/1997 |
| JP | 2001-059954 * | 3/2001 |

OTHER PUBLICATIONS

Stephenson,III., et al., "Cholesteric Liquid Crystal Display System", filed Sep. 27, 2002, U.S. Appl. No. 10/256,930.

(Continued)

Primary Examiner—Lun-Yi Lao
(74) Attorney, Agent, or Firm—Kathleen Neuner-Manne; Carl F. Ruoff (57) ABSTRACT

A display writer for writing on a light writable display of the type having a layer of cholesteric liquid crystal material disposed between two conductors, the cholesteric liquid crystal material having multiple stable optical states at zero electrical field; and a light absorber for forming an image wise thermal pattern in the cholesteric liquid crystal sufficient to change the optical state of the cholesteric liquid crystal in response to an image wise pattern of light, the display writer including a flash lamp; a reflective light modulator for modulating light from the flash lamp an image wise pattern; optics for directing the image wise modulated light onto the light writable display; and means for applying an electrical field to the conductors of the display in conjunction with activation of the flash lamp.

14 Claims, 6 Drawing Sheets

U.S. PATENT DOCUMENTS

| | | | |
|---|---|---|---|
| 5,437,811 A | | 8/1995 | Doane et al. |
| 5,448,226 A | | 9/1995 | Failing, Jr. et al. |
| 5,467,146 A | * | 11/1995 | Huang et al. ............... 348/743 |
| 5,526,148 A | * | 6/1996 | Moffat et al. ................. 349/20 |
| 5,751,257 A | | 5/1998 | Sutherland |
| 5,771,005 A | | 6/1998 | Goodwin, III |
| 5,997,150 A | * | 12/1999 | Anderson ................... 362/227 |
| 6,130,603 A | | 10/2000 | Briechle |
| 6,185,047 B1 | | 2/2001 | Peterson et al. |
| 6,186,555 B1 | | 2/2001 | Rawlings |
| 6,392,725 B1 | * | 5/2002 | Harada et al. ................ 349/74 |
| 6,394,870 B1 | | 5/2002 | Petruchik et al. |
| 6,423,368 B1 | * | 7/2002 | Stephenson et al. .......... 427/64 |
| 6,480,324 B2 | | 11/2002 | Quate et al. |
| 6,580,481 B2 | * | 6/2003 | Ueda et al. ................. 349/115 |
| 6,885,409 B2 | * | 4/2005 | Stephenson et al. ........... 349/2 |

OTHER PUBLICATIONS

Capurso et al., "Hand-Held Programmer for Programmable Liquid Crystal", filed Jun. 25, 2002, U.S. Appl. No. 10/178,979.

Larry J. Hornbeck, A Digital Light Processing Update—Status and Future Applications:, SPIE vol. 3634, Jan. 1999, pp. 158-170.

Rumiko Yamaguchi et al., "Thermally Addressed and Erasable Displays by Polymer-Dispersed Nematic Liquid Crystals With Memory Properties"., 2320 Journal of theSociety for Information Display Oct. 1, 1993 No. 3, Santa Ana, CA, US., pp. 347-352.

V. Ya. Zyryanov., "Thermooptical Recording of Information in Polymer-Encapsulated Cholesteric Liquid Crystals"., Tech., Phys. 41 (8), Aug. 1996, pp. 799-802.

* cited by examiner

APPARATUS FOR ELECTRO-OPTICALLY WRITING A DISPLAY

Reference is made to commonly-assigned U.S. Patent Application commonly-assigned U.S. Pat. No. 6,394,870, the disclosure of which is incorporated herein by reference.

FIELD OF THE INVENTION

The present invention relates to apparatus for updating memory displays.

BACKGROUND OF THE INVENTION

Retail stores offer goods for sale and need to provide customers with information on item pricing. Price labels typically provide information describing an item the price for that item and a machine-readable code for the item, typically in UPC bar code format. The price of items often changes rapidly, requiring that printed retail labels be manually changed. Items that are on sale often have a larger secondary label, called a shelf-talker, that highlights items on sale for customers. The process of writing and changing retrial pricing is costly, primarily in the labor required to replace tags. Recent art addresses the problem using digital data transmission to electrically changeable retail labels, known as Electronic Shelf Labels (ESL).

U.S. Pat. No. 5,448,226 describes an ESL system having a plurality of electronic price labels (sic) fitted into rails. The rails provide power and communication to each label. Connection to the rail can be provided through direct electrical connection to a conductor in the rail or a radio frequency (RF) interface. The label can be powered though direct electrical connection to power conductors in the rail, a battery or solar cell. Such systems require two sets of patterned conductors and expensive, complex electronic and communication structures.

U.S. Pat. No. 6,186,555 describes paper shelf-talkers that can be attached to conventional paper shelf labels to identify items on sale. Adhesive strips are applied to a perforated substrate that is printed to align text with the adhesive label. Attaching such a shelf-talker to a label requires the assembly to be discarded when pricing is changed. U.S. Pat. No. 5,771,005 describes an auxiliary electronic display that can be attached to an electronic price label (sic) The auxiliary display acts as an electronic shelf talker to identify special prices on goods. Such systems require two sets of patterned conductors and expensive, complex electronic and communication structures.

U.S. Pat. No. 6,130,603 provides a good reference for current Electronic Shelf Labels. Independent modules contain a power supply, antenna and controller. The controller is attached to a conventional liquid crystal display that requires periodic refreshing to maintain an image. Displays in ESLs currently display data on simple seven-segment numeric data. An internal power supply expends about half its power maintaining the display image and the other half of the power maintaining the RF link. Such displays have limited display resolution, and must incorporate expensive and bulky controller and transmission electronics. Such displays further must incorporate a power supply that further increases cost and size.

U.S. Pat. No. 5,751,257 issued May 12, 1998 to Sutherland shows an electronic shelf label having a first and second substrates. Sutherland omits the expensive controller and power portions of the ESL, using a programming device translated across a series of pins and to write segments of an electronic display formed between the two glass substrates. The Southerland apparatus is unreliable, requiring the device to be positioned at a specific initial position and translated specific sequence and rate to update the shelf tag. The amount of information displayed in the Southerland patent is limited to simple numeric data. Such systems omits expensive, complex electronic and communication structures, but require two sets of patterned conductors.

U.S. Pat. No. 3,401,262 issued Sep. 10, 1968 to Fergason et al. discloses a cathode ray tube to apply light to a screen. The screen has a photoconductive layer that is excited by an electrical field applied by fine leads across the photoconductive layer. The screen has a layer of a temperature sensitive cholesteric material that changes reflective wavelength with slight changes in temperature, and changes hue in heated areas. Light from the cathode ray tube strikes the photoconductor layer, creating heat which can be used to selectively change the color of the sheet of cholesteric material. The system uses a complex cathode ray tube and a photoconductor layer and ceases to present an image in the absence of an electrical field.

U.S. Pat. No. 3,578,844 issued May 18, 1971 to Churchill discloses a sheet of gelatin encapsulated cholesteric material without a photosensitive layer. The sheet is put into a first reflective state by heating. Portions of the sheet are written into a black (clear) state by the application of DC fields. The sheet is heated to reset the display. The encapsulated material in the sheet retained written information without fade at ambient conditions for eight weeks. Such systems require two sets of patterned conductors and expensive, complex electronic and communication structures.

U.S. Pat. No. 3,789,225 issued Jan. 29, 1974 to Leder discloses a glassy cholesteric liquid crystal between glass plates. Glassy liquid crystal materials are solidified liquid crystals in an ordered state at ambient temperatures. They are not responsive to electrical fields in the glassy state. The apparatus writes the sheet to an initial state by heating the material above the isotropic (liquid) transition point. As the material is cooled, a high-intensity xenon flash lamp is used to disturb the material so that flash disturbed areas solidify into a state different than areas not receiving flash energy. The imaging system requires that the materials be raised to a high temperature, and cooled at a fast rate in the presence of selective high-intensity flash illumination. No electrical fields are applied to the media.

Conventional, non-glassy liquid crystals have the property of being electrically driven between a planar state reflecting a specific visible wavelength of light and a light scattering focal-conic state at ambient temperatures. Chiral nematic liquid crystals, also known as cholesteric liquid crystals have the capacity of maintaining one of multiple given states in the absence of an electric field. U.S. Pat. No. 5,437,811 issued Aug. 1, 1995 to Doane et al. discloses a light-modulating cell having a polymer dispersed chiral nematic liquid crystal. The chiral nematic liquid crystal has the property of being driven between a planar state reflecting a specific visible wavelength of light and a weakly light scattering focal-conic state. Chiral nematic liquid crystals, also known as cholesteric liquid crystals, have the capacity of maintaining one of multiple given states in the absence of an electric field. The Doane et al. patent discloses the use of only electrical fields to change the optical state of cholesteric liquid crystals. The technology writes image data line sequentially. Sequentially writing data lines is slow compared to writing all pixels at once and requires electrical drivers on each column and row line. Such systems require two sets of patterned conductors and expensive, complex electronic and communication structures.

Displays with pattern of patterned conductors are limited by the resolution of patterning. Fine pitch displays have a high electronic cost due to electronic switching elements on many lines. A typical shelf talker might measure 57 millimeters tall be 100 millimeters high. Typical low cost TN and STN displays are limited to about 3 pixels per millimeter. A shelf talker having a 3 pixel per millimeter pitch would have 473 electrically driven lines. Shelf talkers require finer resolution, preferably 12 pixels per millimeter resolution. That resolution is beyond the technical capacity of low-cost TN and STN displays. A 12 pixels per millimeter shelf talker would have 1880 driven lines, and require finer etching. Electrically driven shelf talkers with the required resolution are economically infeasible.

Light written systems can incorporate a variety of light modulating devices, including transmissive liquid crystal displays, reflective liquid crystal displays or reflective light modulators, such as a Digital Micromirror Device (DMD) from Texas Instruments.

The largest application of DMDs is in digital light projection system, see for example U.S. Pat. No. 6,185,047 issued Feb. 6, 2001 to Peterson et al which discloses the structure of a typical digital light projection system. A short arc (1.3 mm) mercury arc lamp is used as an illumination source. Such lamps provide a continuous energy output. A short arc lamp efficiently produces highly collimated light (good etendu) useful for high-frequency light modulation. Digital light projectors use an elliptical reflector with a cold mirror surface to reflect only visible light. Infrared light, which is a significant portion of the lamp's energy is not processed by such projectors. These types of light projection systems output a small fraction of the total energy produced by a lamp.

Systems using DMDs have operated on non-visible portions of the spectrum. U.S. Pat. No. 5,072,239 is early apparatus which modulated the full output of a tungsten-halogen lamp to provide an image on a xerographic reproduction system. U.S. Pat. No. 6,480,324 operates on the light having wavelengths between 365 and 410 nanometers, which corresponds to near ultra-violet wavelengths. The modulated ultra-violet light is used to optically pattern lithographic resin. Neither of the last two cited patents provides a rewritable image on a media.

There is a need therefore for a low cost rewritable shelf label having high resolution. It is preferable that the image bearing member simple and low-cost, having no connected electrical drive, and having unpatterned electrical conductors.

SUMMARY OF THE INVENTION

The need is met according to the present invention by providing a display writer for writing on a light writable display of the type having a layer of cholesteric liquid crystal material disposed between two conductors, the cholesteric liquid crystal material having multiple stable optical states at zero electrical field; and a light absorber for forming an image wise thermal pattern in the cholesteric liquid crystal sufficient to change the optical state of the cholesteric liquid crystal in response to an image wise pattern of light, the display writer including a flash lamp; a reflective light modulator for modulating light from the flash lamp an image wise pattern; optics for directing the image wise modulated light onto the light writable display; and means for applying an electrical field to the conductors of the display in conjunction with activation of the flash lamp.

DETAILED DESCRIPTION OF THE INVENTION

Figure 1:
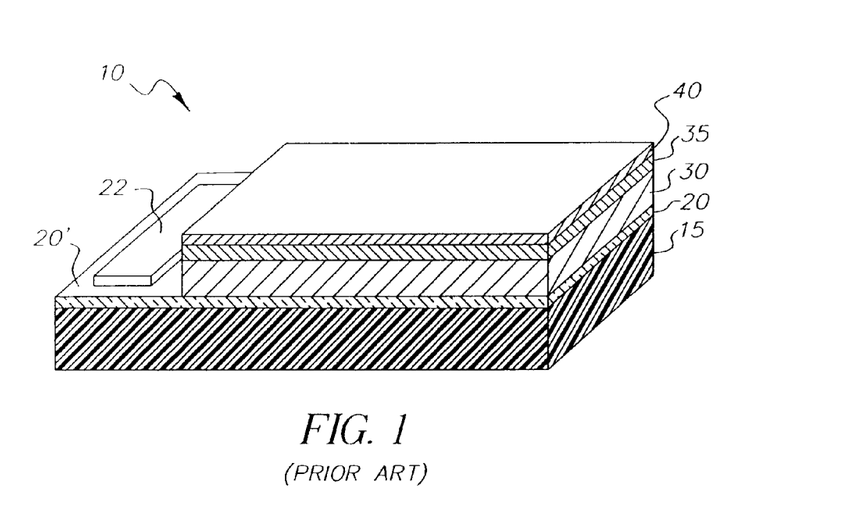
FIG. 1 is a perspective schematic view of a prior art display that can be written in accordance with the present invention.

Referring to FIG. 1 a prior display 10 which can be written in accordance with the present invention includes a display substrate 15, such as a thin transparent polymeric material, for example, Kodak Estar film base formed of polyester plastic that has a thickness of between 20 and 200 (preferably 125 microns). Other polymers, such as transparent polycarbonate, can also be used.

A first transparent conductor 20 is formed on display substrate 15. First transparent conductor 20 can be tin-oxide, indium-tin-oxide (ITO), or polythiophene, with ITO being the preferred material. Typically the material of first transparent conductor 20 is sputtered or coated as a layer over display substrate 15 having a resistance of less than 1000 ohms per square.

Cholesteric layer 30 overlays a first portion of first transparent conductor 20. A portion of cholesteric layer 30 is removed or is uncoated to create exposed first conductor 20' to permit electrical contact. Cholesteric layer 30 contains cholesteric liquid crystal material, such as those disclosed in U.S. Pat. No. 5,695,682 issued Dec. 9, 1997 to Doane et al. Application of electrical fields of various intensity and duration can be employed to drive a chiral nematic material (cholesteric) into a reflective state, to a substantially transparent state, or an intermediate state. These materials have the advantage of having first and second optical states that are both stable in the absence of an electrical field. The materials can maintain a given optical state indefinitely after the field is removed. Cholesteric liquid crystal materials can be Merck BL112, BL118 or BL126, available from E.M. Industries of Hawthorne, N.Y.

Cholesteric layer 30 is E.M. Industries' cholesteric material BL118 dispersed in deionized photographic gelatin. The liquid crystal material is mixed at 8% concentration in a 5% gelatin aqueous solution. The liquid crystal material is dispersed to create an emulsion having 8-10 micron diameter domains of the liquid crystal in aqueous suspension. The domains can be formed using the limited coalescence technique described in U.S. Pat. No. 6,423,368 issued Jul. 23, 2002 to Stephenson et al. The emulsion is coated on a polyester display substrate 15 over the first transparent conductor 20 and dried to provide an approximately 9-micron thick polymer dispersed cholesteric coating. Other organic binders such as polyvinyl alcohol (PVA) or polyethylene oxide (PEO) can be used in place of the gelatin. Such emulsions are machine coatable using coating equipment of the type employed in the manufacture of photographic films. A thin layer of gelatin can be applied over first transparent conductor 20 to provide an insulator prior to applying cholesteric layer 30 as disclosed copending U.S. Ser. No. 09/915,441 filed Jul. 26, 2001 by Stephenson et al.

Figure 2:
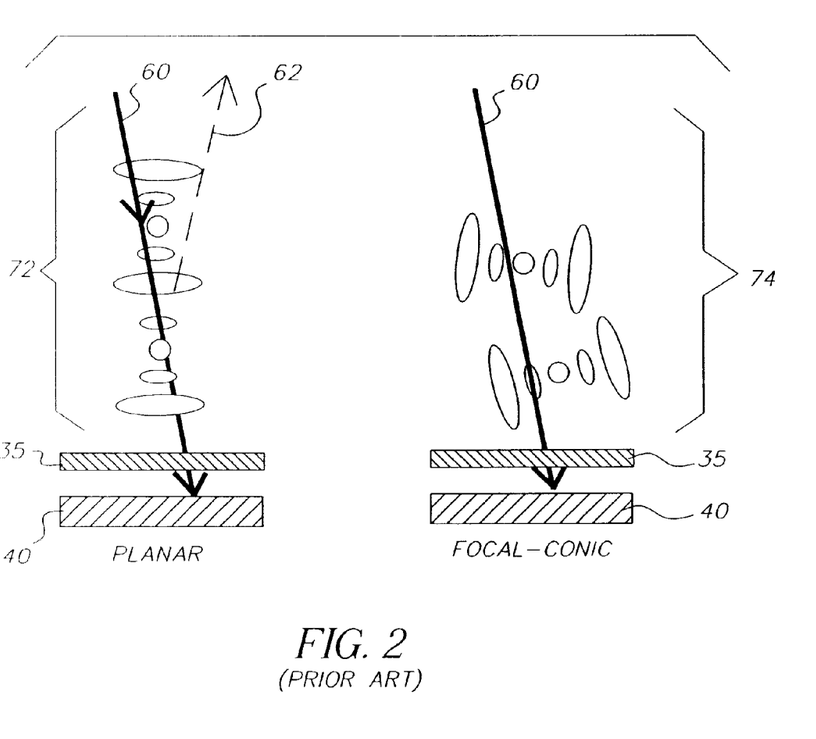
FIG. 2 is a schematic view useful in describing the known behavior of chiral nematic material in a planar and focal-conic state responding to incident light.

Referring to FIG. 2 a chiral nematic material is shown in a planar and focal-conic state responding to incident light. In the figure on the left, after a high voltage field has been applied and quickly switched to zero potential, the liquid crystal molecules become planar liquid crystal 72, which reflect portions of incident light 60 as reflected light 62. In the figure on the right side of FIG. 2, upon application of a lower voltage field, the molecules of the chiral nematic material break into weakly forward scattering cells known as focal-conic liquid crystal 74. Increasing the time duration of a low-voltage pulse progressively drives the molecules that were originally reflective planar liquid crystal 72 towards a fully evolved and weakly light scattering focal-conic liquid crystal 74.

A light absorbing dark layer 35 (herein called a dark layer because it absorbs visible and IR light, but it can absorb only a portion of the visible spectrum and have a colored appearance) is positioned on the side opposing the incident light 60. Dark layer 35 can be a thin layer of light absorbing, sub-micron carbon in a gel binder as disclosed copending U.S. Ser. No. 10/036,149 filed Dec. 26, 2001 by Stephenson. As fully evolved focal-conic liquid crystal 74, the cholesteric liquid crystal is forward light scattering and incident light 60 passing through dark layer 35 is absorbed to create a black image. Progressive evolution towards the focal-conic state causes a viewer to perceive reflected light 62 that is reduced to black as the cholesteric material changes from reflective planar liquid crystal 72 to a fully evolved light scattering focal-conic liquid crystal 74. When the field is removed, cholesteric layer 30 maintains a given optical state indefinitely. The states are more fully discussed in U.S. Pat. No. 5,437,811, referenced above.

Returning to FIG. 1, dark layer 35 is disposed between second conductor 40 and cholesteric layer 30 to improve contrast. A second conductor 40 overlays cholesteric layer 30. Second conductor 40 has sufficient conductivity to provide an electric field between the first transparent conductor 20 and second conductor 40 strong enough to change the optical state of the cholesteric material in cholesteric layer 30. Second conductor 40 can be formed, for example, by the well-known technique of vacuum deposition for forming a layer of conductive material such as aluminum, tin, silver, platinum, carbon, tungsten, molybdenum, tin or indium or combinations thereof. Second conductor 40 can also be formed by screen printing a conductive ink such as Electrodag 423SS screen printable electrical conductive material from Acheson Corporation. Such screen printable conductive materials comprise finely divided graphite particles in a thermoplastic resin. Screen printing is preferred to minimize the cost of manufacturing the display. A first conductor cover 22 can be similarly printed over first transparent conductor 20. First conductor cover 22 protects first transparent conductor 20 from abrasion.

The use of a flexible support for display substrate 15; first transparent conductor 20; machine coated dark layer 35 and cholesteric layer 30; and printed second conductor 40 and first conductor cover 22 permits the fabrication of a low cost flexible display. Small flexible displays can be used as rewritable tags for inexpensive, limited rewrite applications.

Figure 3:
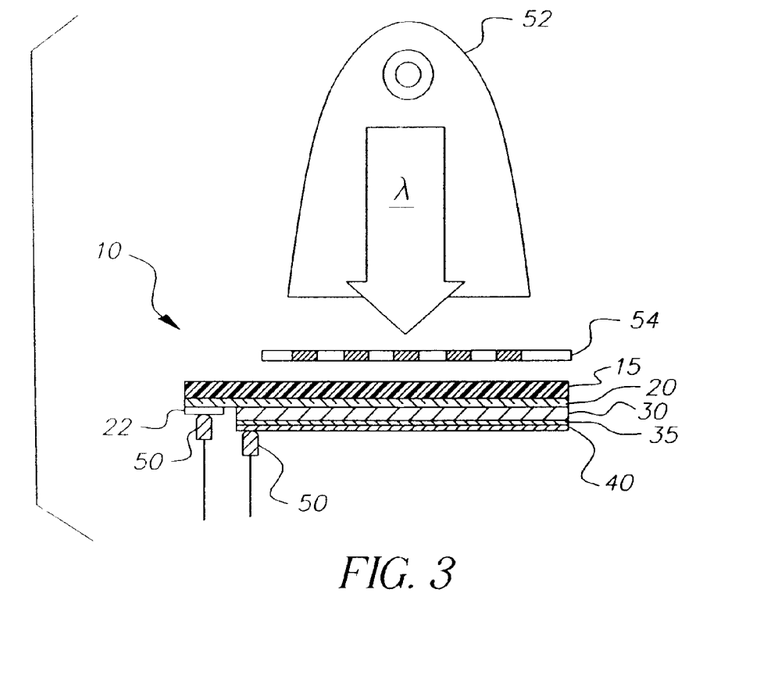
FIG. 3 is schematic side view of test apparatus used to electro-optically write an image on a display.

Referring to FIG. 3 test apparatus used to electro-optically write an image on a display 10 was positioned so that a conventional xenon flash unit 52 illuminated portions of display 10 through mask 54. In the experiment, flash unit 52 was a Vivitar model 285HV professional flash lamp unit and mask 54 was a sheet of Dupont Mylar transparency with an electro-photographic printed image. The output of flash unit 52 was adjusted to imprint an image on display 10 if the cholesteric material was initially either planar liquid crystal 72 or focal-conic liquid crystal 74.

Electrodes 50 were applied to first conductor cover 22 and second conductor 40. An electrical field was applied across electrodes 50, and flash unit 52 imprinted images on display 10 were erased. Display 10 could be imprinted and erased multiple times without damage to display 10. Display 10 was positioned so that the black second conductor 40 faced flash unit 52 and mask 54. Flash unit 52 could be adjusted so that images were imprinted through opaque second conductor 40. The images were electrically erased by applying a field across electrodes 50. From these experiments, it was concluded that the printing process occurs due to the combination of an electric field applied across electrodes 50 and thermal energy applied to through either side of display 10. A heat pulse of correct power and duration provides a thermal flux effect in conjunction with an electric field that writes cholesteric material into either the planar or focal-conic state or combination of the two states. Display 10 can be have unpatterned conductors, and an image can be imprinted using a mask 54. These experiments demonstrated the utility of masked high-intensity light to thermally print and reprint images on polymer dispersed cholesteric liquid crystals. The method and materials permit multiple erasure and writing cycles. Furthermore, the structure of display 10 is flexible and low-cost.

Experiments were performed to determine the response of display 10 to the application of constant electrical fields during the thermal heat pulses from flash unit 52. In a first experiment, display 10 was electrically written into the planar state using a high voltage pulse. The output of flash unit 52 was set so initially planar liquid crystal was selectively written into the focal-conic state in unmasked areas. The display was repeatedly reset to the planar state, and written using a series of voltages.

Figure 4:
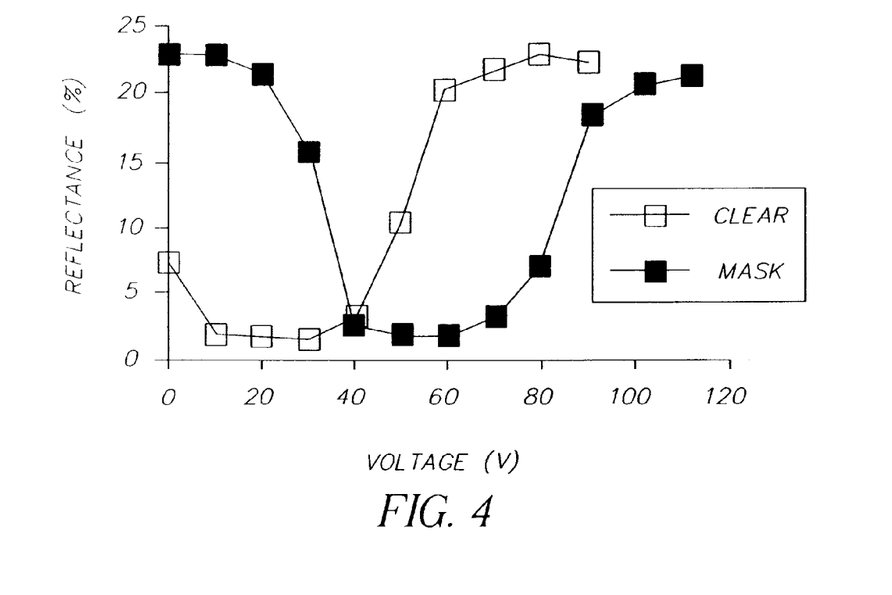
FIG. 4 is a plot of the response of the display of FIG. 1, originally in the planar state, to constant flash lamp energy and various voltages.

FIG. 4 is a plot of the response of the display of FIG. 1, originally in the planar state, at constant flash lamp energy and various voltages. For each test, the material was initialized into the planar state using a high voltage pulse. A voltage was applied during a flash event. The resulting curve is equivalent to the response curve found in the Doane et al. patent for electrically written cholesteric liquid crystal. The curve for the masked portion of the display (filled boxes) is the same as the response of a display in the absence of the thermal pulse provided by flash unit 52. The curve for the unmasked (clear) portion of the display shows the response of the display in the presence of the heat pulse from the flash combined with an electrical field. At zero applied voltage and without a mask, planar material is written into the focal conic-state and has a reflectance of about 7 percent. Applying a low voltage, such as 10 volts, improves the clarity of focal-conic state from 7 percent to about 2 percent reflectance, significantly improving the contrast layer of imprinted images. It can be seen from FIG. 4 that applying a high voltage, such as 60 volts, provides another pair of bistable states.

Figure 5:
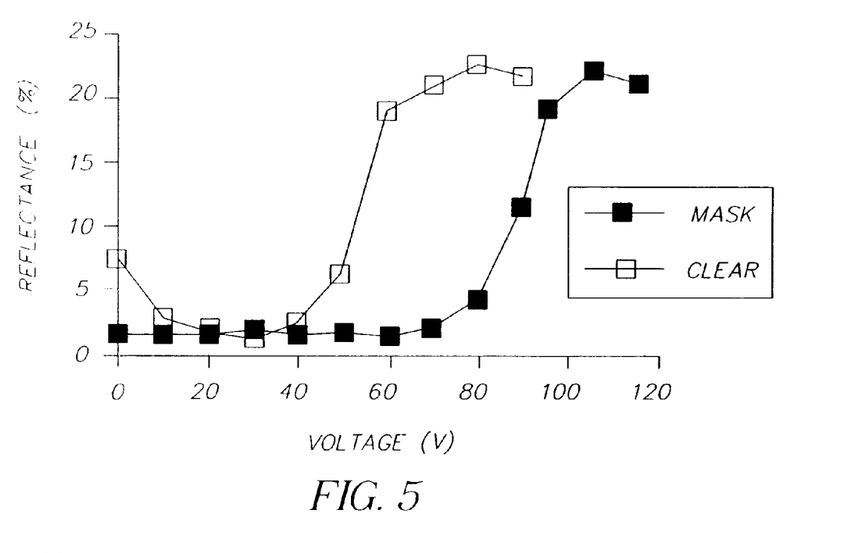
FIG. 5 is a plot of the response of the display of FIG. 1, originally in the focal-conic state, to constant flash lamp energy and various voltages.

FIG. 5 is a plot of the response of the display of FIG. 1, originally in the focal-conic state, at constant flash lamp energy and various voltages. Application of a low electrical field again reduces the reflection of focal-conic material from 7 percent to 2 percent and provides contrast improvement. Only one pair of bistable states is possible in this system, again at 60 volts, which has a contrast ratio of about 13. Material initially in the focal-conic state remains in the focal-conic state at a medium level voltage. Energy from flash unit 52 causes initially focal-conic material to be driven into the planar state. Apparently, heat from flash unit 52 reduces the voltage required to drive cholesteric material into the planar state.

It was observed that at 60 volts of applied field, the final state of the material was defined by mask 54 if the material was initially in either the planar or focal-conic state. The phenomenon eliminates the need to initially write the material into an initial state before flash-writing an image. The single writing process, without an initialization step, provides a fast, parallel method of writing display 10.

The test apparatus employed an unfiltered flash unit 52 and a mask 54 which operated on all wavelengths of radiation emitted by flash unit 52. When an infrared filter was positioned between display 10 and flash unit 52, higher output was needed from flash unit 52 to write images. The experiment indicated that all energy, including spectra outside the visible spectrum, emitted by flash unit 52 is useful in forming images in displays 10. It is useful that the entire energy output of a flash unit be used in forming images.

Figure 6:
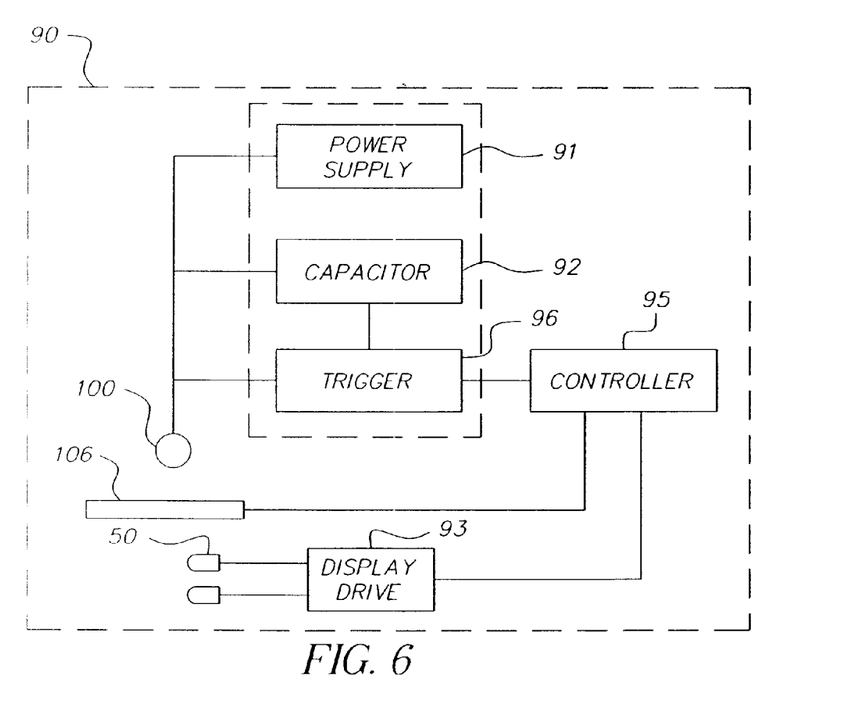
FIG. 6 is a schematic diagram for a display writer in accordance with the present invention.

Referring to FIG. 6 a display writer in accordance with the present invention includes a power supply 91 that provides power to a flash capacitor 92 and to the display drive 93. A reflective light modulator 106 (such as a DMD) is disposed to modulate the output of flash lamp 100. Controller 95 supplies information to create an image pattern on reflective light modulator 106. Controller 95 applies writing voltage to electrodes 50 through display drive 93, connected to display 10. A trigger circuit 96 triggers flash unit 52 in conjunction with the application of a bipolar electrical field from display drive 93. The flash energy is selectively projected by reflective light modulator 106 to apply an image-wise light pattern from flash lamp 100 in conjunction with an applied field to write an image on display 10.

Figure 7:
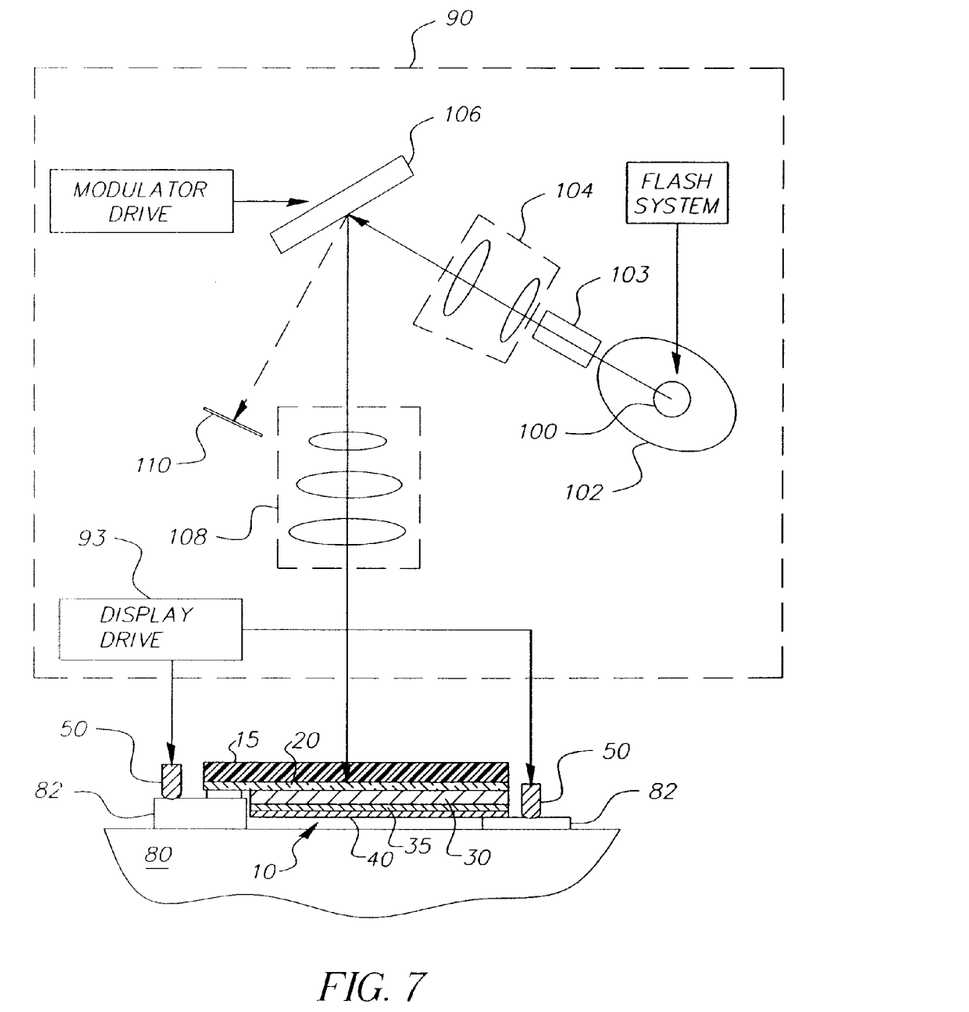
FIG. 7 is a more detailed schematic diagram for a display writer in accordance with the present invention.

Referring to FIG. 7, display 10 is attached to an object 80, which has conductive adhesive contacts 82 attaching display 10 to object 80. Display writer 90 is connected to display 10 when electrodes 50 are pressed against contacts 82. Sensors (not shown) of conventional design can be connected to controller 95 to signal that display writer 90 is connected to display 10. Switching means activates controller 95 to write an image to display 10. The writing method, previously disclosed, can be used to write an image on display 10. Display writer 90 can be detached from display 10, and used to write other displays 10. Object 80 has an attached display 10 that has been updated after writing.

Figure 8:
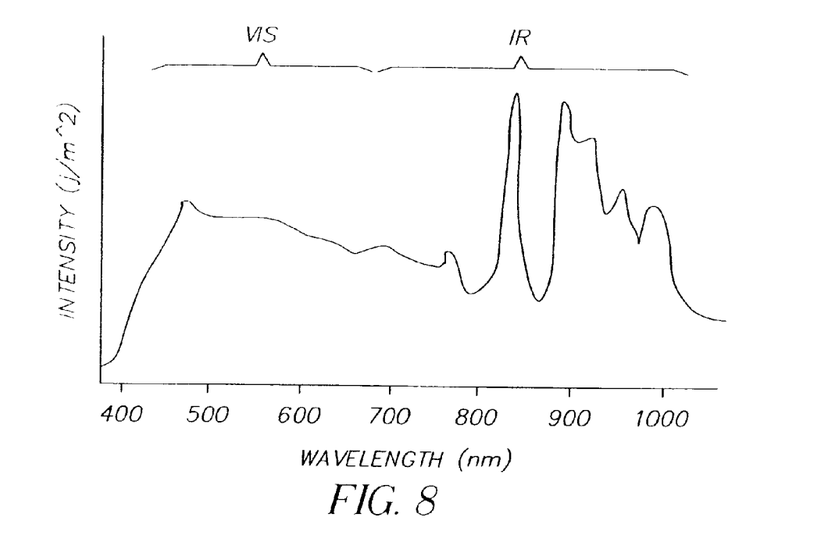
FIG. 8 is a plot of the spectral output of a commercial flash unit.

A flash lamp 100 such as a glass envelope filled with xenon gas with two closely spaced electrodes for energizing the xenon gas. FIG. 8 is a plot of the typical spectral output of a xenon flash unit. Xenon flash lamps in such flash units emit both visible and infrared radiation, wherein a significant portion of the light output is in the infrared. Both the infrared and visible portions of the spectrum are useful in providing an image-wise heat pattern on display 10. Power-efficient, highly collimated light for high-resolution images is produced from sources having short arcs, preferably under 3 millimeter in length. Flash lamp 100 is an approximate point source, comprising a high-intensity flash lamp, such as a PerkinElmer QCA 20 flash lamp with an arc length of 1.5 millimeters.

Reflector 102 encloses flash lamp 100. Reflector 102 is an elliptical or parabolic reflector having a reflective surface that reflects both visible and infrared energy. Reflector 102 has optimized geometry that collects light emitted from flash lamp 100 and directs the energy to integrator 103. Integrator 103 can be either a rod integrator or lenslet integrator of conventional design. Integrator 103 serves the purpose of creating an area of highly collimated light having uniform intensity across an area matching the surface area of a modulator. Collimating optics 104 gather light emitted from integrator 103 and directs the light onto reflective modulator 106. Both integrator 103 and collimating optics 104 are designed to operate on both visible and infrared wavelengths of light.

Figure 9:
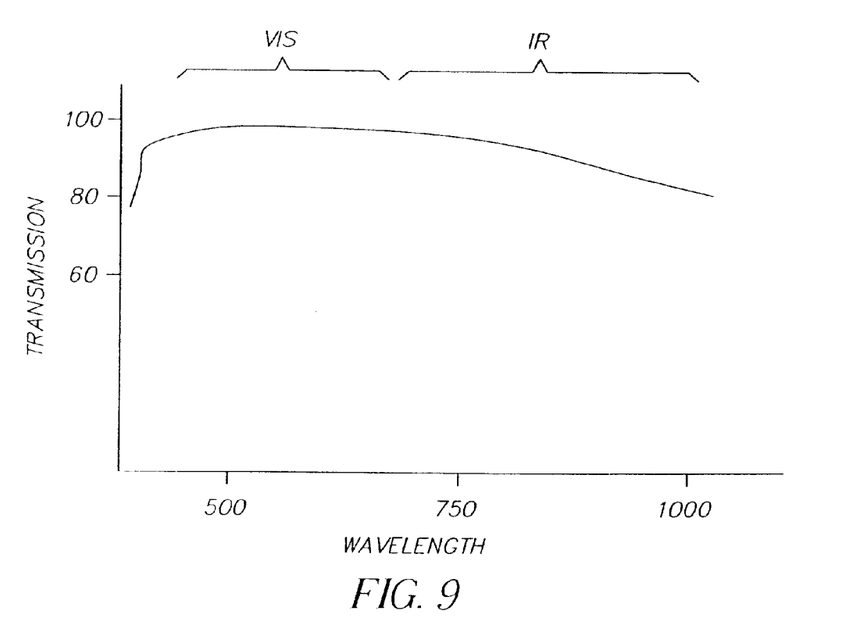
FIG. 9 is a plot of the reflection for visible and infrared wavelengths of a digital micro-mirror (DMD) device used in the writing apparatus shown in FIG. 10.

Collimated, uniform light strikes reflective modulator 106 that is modulated to exhibit an image-wise pattern of reflective states. Reflective modulator 106 is preferably comprised of an array of electrically driven reflectors with high reflective efficiency in both the visible and infrared portions of the spectrum. Devices useful in the application include Texas Instrument Digital Micro-mirror Devices (DMDs). Preferably, such devices include optical windows that are highly transmissive in both the visible and infrared range. FIG. 9 is a plot of the reflection for visible and infrared wavelengths of a digital micro-mirror (DMD) device used in the writing apparatus shown in FIG. 7. Digital Micro-mirror devices with such windows efficiently provide an image-wise pattern of light including both the visible and infra-red portions of the spectrum.

Reflective modulator 106 selectively directs pixels of incident light into either sink 110 or focusing optics 108. Non-imaging light is directed into sink 110 is converted to heat and pixels of light passing into focusing optics 108 provide an image wise pattern of light, and ultimately heat, to display 10. Focusing optics 108 operate on both visible and infrared portions of light and to generate an image wise pattern of both visible and infrared energy.

Figure 10:
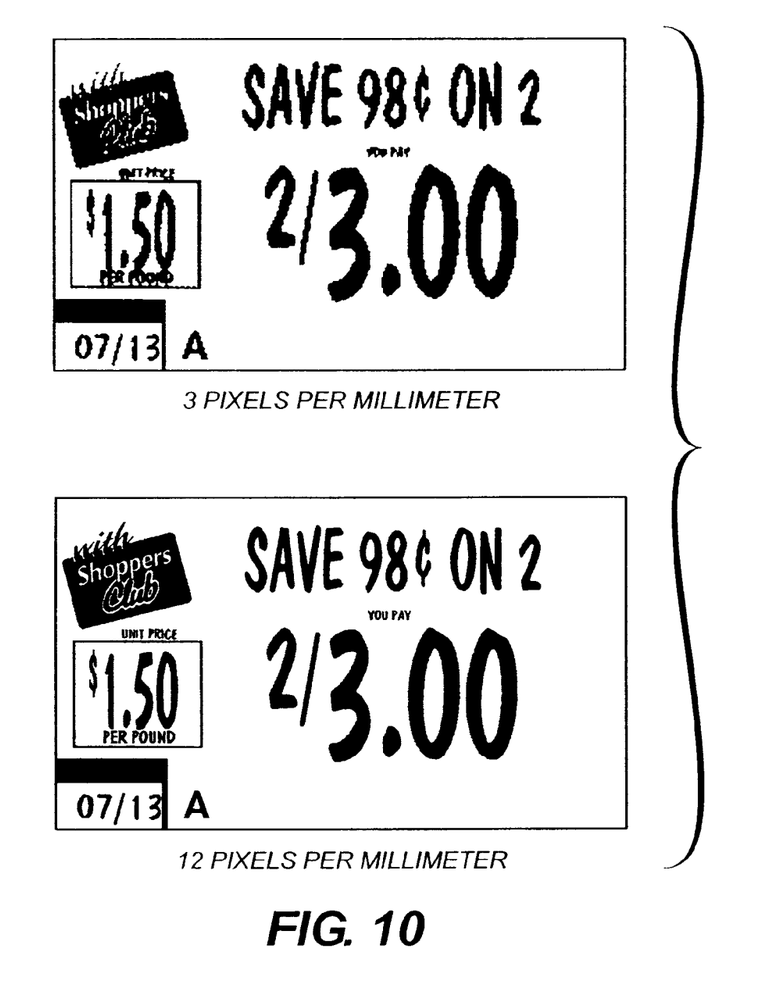
FIG. 10 shows typical shelf talker images at 3 pixels per millimeter and 12 pixels per millimeter resolution printed with the apparatus of the present invention.

The invention is directed to re-writable shelf talkers in retail applications. FIG. 10 shows typical shelf talker images at 3 pixels per millimeter and 12 pixels per millimeter resolution. Typical paper shelf talkers measure 57 millimeters high, 100 millimeters wide and are printed at 12 pixel per millimeter resolution. Low cost twisted nematic (TN) and super-twisted nematic (STN) displays that might be used in the application are limited to a resolution of about 3 pixels per millimeter. A shelf talker with an electronic display with 3 pixel per millimeter pitch does not have the resolution required for the application. Such displays require resolution limiting patterned conductors and electronic drive for 471 lines. A 12 pixels per millimeter shelf talker would have 1880 driven lines, and require finer traces than are technically possible. Electrically driven shelf talkers with the required resolution are economically and technically infeasible.

This invention provides high-resolution images on rewritable displays 10. A Texas Instrument DMD device having 1024 by 768 pixels is the preferred device for reflective modulator 106. For the proposed shelf talker dimensions, such a reflective modulator 106 provides 10 pixels per millimeter close to the resolution required for a shelf talker. The invention generates images on an inexpensive display 10 with no attached electronic drive and no patterned conductors. Images are formed on display 10 efficiently using a point flash source, and optical components throughout the system that operate on both visible and infrared radiation to provide a sharp image.

The invention has been described in detail with particular reference to certain preferred embodiments thereof, but it will be understood that variations and modifications can be effected within the spirit and scope of the invention.

PARTS LIST 10 display
15 display substrate
20 first transparent conductor
20' exposed first conductor
22 first conductor cover
30 cholesteric layer
35 dark layer
40 second conductor
50 electrodes
52 flash unit
54 mask
60 incident light
62 reflected light
72 planar liquid crystal
74 focal-conic liquid crystal
80 object
82 contacts
90 display writer
91 power supply
92 flash capacitor
93 display drive
95 controller
96 trigger circuit
100 flash lamp
102 reflector
103 integrator
104 collimating optics
106 reflective modulator
108 focusing optics
110 sink

What is claimed is:

1. A display writer for writing on a light writable display of the type having a layer of cholesteric liquid crystal material disposed between two conductors, the cholesteric liquid crystal material having multiple stable optical states at zero electrical field; and a light absorber for forming an image wise thermal pattern in the cholesteric liquid crystal sufficient to change the optical state of the cholesteric liquid crystal in response to an image wise pattern of light, the display writer comprising:
    a) a flash lamp that emits visible and infrared radiation;
    b) a reflective light modulator for modulating the visible and infrared radiation from the flash lamp an image wise pattern;
    c) optics for directing the image wise modulated light onto the light writable display; and
    d) means for applying an electrical field to the conductors of the display in conjunction with activation of the flash lamp.

2. The display writer claimed in claim 1, wherein the flash lamp is a short arc flash lamp having an arc less than 3 mm.

3. The display writer claimed in claim 1, wherein the flash lamp includes a reflector for directing infrared and visible radiation to the reflective light modulator.

4. The display writer claimed in claim 1, wherein the optics includes collimating optics between the flash lamp and the reflective light modulator, and projection optics between the digital micro-mirror light modulator and the display.

5. The display writer claimed in claim 4, wherein the optics transmit both visible and infra red radiation.

6. The display writer claimed in claim 5, wherein the collimating optics include an integrating rod for integrating both visible and infra red radiation.

7. The display writer claimed in claim 1, wherein the reflective light modulator modulates both visible and infra red radiation.

8. A method of writing on a light writable display of the type having a layer of cholesteric liquid crystal material disposed between two conductors, the cholesteric liquid crystal material having multiple stable optical states at zero electrical field; and a light absorber for forming an image wise thermal pattern in the cholesteric liquid crystal sufficient to change the optical state of the cholesteric liquid crystal in response to an image wise pattern of light, comprising:
    a) providing a display writer having a flash lamp that emits visible and infrared radiation, a reflective the visible and infrared radiation modulator for modulating radiation from the flash lamp an image wise pattern, optics for directing the image wise modulated radiation onto the light writable display; and means for applying an electrical field to the conductors of the display; and
    b) sending an image to the reflective light modulator; and
    c) applying the electrical field to the conductors of the display in conjunction with the discharge the flash lamp to write the image on the display.

9. The method claimed in claim 8, wherein the flash lamp is a short arc flash lamp having an arc less than 3 mm.

10. The method claimed in claim 8, wherein the flash lamp includes a reflector for directing infrared and visible radiation to the reflective light modulator.

11. The method claimed in claim 8, wherein the optics includes collimating optics between the flash lamp and the reflective light modulator, and projection optics between the digital micro-mirror light modulator and the display.

12. The method claimed in claim 11, wherein the optics transmit both visible and infra red radiation.

13. The method claimed in claim 11, wherein the collimating optics include an integrating rod for integrating both visible and infra red radiation.

14. The method claimed in claim 8, wherein the reflective light modulator modulates both visible and infra red radiation.

* * * * *